United States Patent [19]

Shiiki et al.

[11] Patent Number: 4,762,755
[45] Date of Patent: Aug. 9, 1988

[54] FERROMAGNETIC MATERIAL AND A MAGNETIC HEAD USING THE SAME MATERIAL

[75] Inventors: Kazuo Shiiki, Tsukui; Noriyuki Kumasaka, Ohme; Yoshihiro Shiroishi, Hachioji; Hitoshi Nakamura, Ohme; Yoshihiro Hamakawa, Kokubunji; Noritoshi Saito, Hachioji; Shigeo Aoki, Katsuta; Kiminari Shinagawa, Chiba; Mitsuhiro Kudo, Nishitama, all of Japan

[73] Assignee: Hitachi, Ltd., Tokyo, Japan

[21] Appl. No.: 665,911

[22] Filed: Oct. 29, 1984

[30] Foreign Application Priority Data

Nov. 2, 1983 [JP] Japan .................................. 58-204834
Jan. 25, 1984 [JP] Japan .................................. 59-10077

[51] Int. Cl.⁴ .............................................. B32B 1/04
[52] U.S. Cl. ........................................ 428/635; 428/928; 428/681; 428/679; 428/693; 148/307; 148/309
[58] Field of Search .................. 360/126, 125, 120; 75/126 Q, 124 R, 128 C, 123 L; 428/638, 635, 683, 928, 679, 681, 693; 148/31.55, 31.57, 307, 308, 309

[56] References Cited

U.S. PATENT DOCUMENTS

| | | | |
|---|---|---|---|
| 4,149,205 | 4/1979 | Berghof et al. | 360/126 |
| 4,190,438 | 2/1980 | Aso et al. | 75/123 L |
| 4,236,946 | 12/1980 | Aboaf et al. | 148/31.55 |
| 4,435,212 | 3/1984 | Ueshima et al. | 148/31.55 |
| 4,473,400 | 9/1984 | Hoselitz | 75/123 L |
| 4,520,076 | 5/1985 | Saito et al. | 428/679 |

FOREIGN PATENT DOCUMENTS

| | | | |
|---|---|---|---|
| 159028 | 10/1985 | European Pat. Off. | 148/309 |
| 55-73847 | 6/1980 | Japan | 75/123 L |
| 55-122223 | 9/1980 | Japan | 360/126 |
| 57-5845 | 1/1982 | Japan | 148/307 |
| 57-2863 | 1/1982 | Japan | 75/123 L |
| 57-39125 | 3/1982 | Japan | 148/31.55 |
| 57-76167 | 5/1982 | Japan | 148/31.55 |
| 57-202708 | 12/1982 | Japan | 148/31.55 |

Primary Examiner—Deborah Yee
Attorney, Agent, or Firm—Antonelli, Terry & Wands

[57] ABSTRACT

A ferromagnetic material is composed of an iron alloy which contains 2 to 12% by weight of silicon and 5 to 25% by weight of at least one element selected from the group consisting of ruthenium, rhodium, palladium, iridium, platinum, gold and silver. This ferromagnetic material exhibits a high saturation flux density and good corrosion resistance. Excellent magnetic characteristics are obtained by a multilayered film which is obtained by alternatingly laminating the above ferromagnetic material and a spacer layer composed of other material. Further, a markedly increased recording density is exhibited by a magnetic head for perpendicular magnetic recording, when the end of the main pole is composed of the ferromagnetic material.

25 Claims, 4 Drawing Sheets

FERROMAGNETIC MATERIAL AND A MAGNETIC HEAD USING THE SAME MATERIAL

BACKGROUND OF THE INVENTION

The present invention relates to a ferromagnetic material which consists chiefly of an iron-silicon system alloy and which has good corrosion resistance and high saturation flux density. More particularly, the invention relates to a ferromagnetic material which consists of a multilayered film having good corrosion resistance, high saturation flux density and high permeability, and to a magnetic head employing the above ferromagnetic material which is suited for high density magnetic recording.

So far, ferrites such as Mn-Zn ferrite and ferromagnetic alloys such as permalloy, sendust, and the like, have been placed in practical use as materials for producing magnetic head cores. These materials, however, have saturation flux densities of as small as about 10 kG, and are not suited for realizing high density magnetic recording.

In recent years, therefore, study has been forwarded with regard to an Fe—Ti crystalline alloy having a saturation flux density of 15 kG and a Co—Zr amorphous alloy having a saturation flux density of 14 kG, which, however, have not yet been put into practical use.

The Fe—Si system alloy has generally been known as a material which has a high saturation flux density, and is much used for forming the cores of transformers. However, the Fe—Si system alloy has poor corrosion resistance and is easily oxidized in the air. The cores of transformers are submerged in an oil and are not exposed to the air. However, the Fe—Si system alloy could not be used at the ends of the head cores that are exposed to the air at all times.

A single layered film having a thickness of about 1 $\mu$m obtained by sputtering the Fe—Si system alloy has a permeability of 300 to 500 and a coercive force of several oersteds. This single layered film, however, is not still satisfactory as a material for making magnetic heads. It is therefore urged to provide a material having a larger permeability and a smaller coercive force.

As described above, there is available no ferromagnetic material which has good corrosion resistance, high saturation flux density, and sufficiently high permeability, and which is suited for producing magnetic head cores. Therefore, it has been desired to develop a magnetic head for high density recording having excellent recording/reproducing characteristics, by using a core material which has characteristics suited for a head material for high density recording.

The following references are cited to show the state of the art; (i) Japanese Utility Model Laid-Open No. 58613/1977, (ii) Japanese Patent Laid-Open No. 54408/1977, (iii) Japanese Patent Laid-Open No. 112439/1981.

SUMMARY OF THE INVENTION

The object of the present invention is to provide a ferromagnetic material which is free from the difficulties inherent in the above-mentioned conventional art, which has good corrosion resistance and high saturation flux density.

Another object of the present invention is to provide a ferromagnetic material which consists of a ferromagnetic multilayered film having good corrosion resistance, high saturation flux density and high permeability.

A further object of the present invention is to provide a magnetic head which is suited for high density recording by using the above-mentioned material at least for a portion of the magnetic core.

According to the present invention, at least one element selected from the group consisting of ruthenium, rhodium, palladium, iridium, platinum, gold and silver, is added in an amount of smaller than 25% by weight, and preferably in an amount of 5 to 25% by weight to the Fe—Si alloy which has high saturation flux density and high permeability, in order to increase the corrosion resistance thereof without sacrificing its soft magnetic property. Among these elements added, ruthenium is effective for strikingly increasing the corrosion resistance permitting the saturation flux density to decrease very little. Further, when aluminum and/or at least one element selected from the group consisting of titanium, chromium, vanadium, molybdenum, zirconium and niobium, are added, there are obtained improved corrosion resistance, wear resistance and permeability owing to composite effects.

If the amount of at least one of the elements among ruthenium, rhodium, palladium, iridium, platinum, gold and silver is smaller than 5% by weight, sufficient corrosion resistance is not obtained. If its amount exceeds 25% by weight, on the other hand, the saturation flux density decreases greatly.

If the amount of addition becomes greater than 5.5% by weight, the corrosion resistance is improved further strikingly. Preferably, therefore, the above element should be added in an amount over the range of 10 to 20% by weight, and more preferably over the range of 15 to 20% by weight. When aluminum is to be added, the amount should be smaller than 3% by weight. When at least one element is to be added among titanium, chromium, vanadium, molybdenum, zirconium and niobium, the amount of addition thereof should be smaller than 5% by weight. If aluminum is added in an amount greater than 3% by weight, or if titanium or the like is added in an amount greater than 5% by weight, the saturation flux density decreases conspicuously.

In the alloy of the present invention, the amount of silicon should range from 2 to 12% by weight. If the amount of silicon falls outside this range, the permeability decreases. More preferably, the amount of silicon should range from 4.5 to 8% by weight.

Aluminum and at least one element among titanium, chromium, vanadium, molybdenum, zirconium and niobium, are helpful for improving the properties as described above, but are not essential elements in the present invention. Further, ruthenium, rhodium, palladium iridium, platinum, gold and silver are all helpful for improving the corrosion resistance. Among them, the addition of ruthenium exhibits particularly excellent effects.

To improve the permeablity of the alloy of the invention, the ferromagnetic multilayered film should be prepared by laminating a plurality of main ferromagnetic films composed of the above-mentioned alloy and having a predetermined thickness via spacer material layers which are made of a material different from the main ferromagnetic films and which have a predetermined thickness. Each of said main ferromagnetic films should have a thickness of 0.02 to 0.5 $\mu$m, and each of the spacer material layer should have a thickness of 20 to 500 angstroms. More preferably, each of the main ferromagnetic films should have a thickness of 0.05 to 0.1 μm, and each of the spacer material layers should have a thickness of 50 to 200 angstroms. If the thickness of the main ferromagnetic film is smaller than 0.02 μm or is greater than 0.5 μm, the permeability is not improved. Further, if the thickness of the spacer material layer is smaller than 20 angstroms, the main ferromagnetic films are no more effectively isolated from each other. If the thickness of the spacer material layer exceeds 500 angstroms, the individual main ferromagnetic films behave independently of each other, and the permeability does not increase.

The material forming the spacer material layers should adhere well to the main ferromagnetic films and should not melt at operation temperatures. Examples of such materials include non-magnetic materials such as $SiO_2$, $Al_2O_3$ and magnetic materials such as cobalt, ferromagnetic cobalt alloy, and nickel-iron alloy. However, a low-melting material such as aluminum is not desirable since is reacts with the main ferromagnetic film.

According to the magnetic head of the present invention, at least a portion of at least one magnetic pole is constituted by the ferromagnetic material, and preferably by the ferromagnetic multilayered film of the present invention. Particularly preferably, therefore, the magnetic head of the present invention employs in at least a portion of the magnetic pole a ferromagnetic multilayered film which is obtained by laminating main ferromagnetic films of an Fe—Si alloy containing at least one element selected from the group consisting of ruthenium, rhodium, palladium, iridium, platinum, gold and silver, via spacer material layers made of a material different from the main ferromagnetic films. In the foregoing were described in detail ferromagnetic multilayerd film employed for the magnetic head of the present invention, and main ferromagnetic films and spacer material layers constituting the ferromagnetic multilayered film.

The magnetic head of the present invention is suited for high density recording purposes, and is particularly suited for the purposes of perpendicular magnetic recording.

To efficiently perform the perpendicular magnetic recording and reproducing, it is essential to sharply generate a perpendicular magnetic field and to detect such a magnetic field. With the head having a main pole which generates and detects the magnetic field, and an auxiliary pole which permits the magnetic flux to easily pass through, it is necessary to magnetically minimize the thickness of the main pole. For this purpose, even a small magnetic pole must permit the magnetic flux of a sufficient amount to easily pass through. Therefore, the magnetic pole which generates and detects the magnetic flux must be made of a material having a high saturation flux density and a high permeability. The material of magnetic pole for this purpose must have a saturation flux density of greater than 10 kG and, preferably, greater than 15 kG, and a permeability (at an operation frequency which usually lies from several megahertz to several tens of megahertz) of greater than 300 and, preferably, greater than 1000. As such a material, the ferromagnetic material of the present invention and, particularly the ferromagnetic multilayered film is best suited. According to the magnetic head of the present invention, the ferromagnetic material of the invention and, preferably, the ferromagnetic multilayered film should be used for constituting at least a portion of the magnetic recording medium side of the magnetic pole that generates and detects the signal magnetic field.

In the magnetic head for perpendicular magnetic recording of the present invention, when at least a portion of the side opposed to the magnetic recording medium, of the main pole is to be constituted by the ferromagnetic multilayered film which consists of main ferromagnetic films and spacer material layers, the number of layers (the number of main ferromagnetic films laminated via spacer material layers) n should be from 2 to 10 and, preferably, from 4 to 8 and, most preferably from 4 to 6. With the number of layers outside the above-mentioned range, the magnetic head for perpendicular magnetic recording fails to produce large recording and reproducing outputs. The permeability of the ferromagnetic multilayered film becomes high when the number of layers is from 2 to 10, and becomes particularly high when the number of layers is from 4 to 8.

The total thickness of the ferromagnetic multilayered film forming at least a portion of the side opposed to the magnetic recording medium, of the main pole, should be from 0.1 to 0.5 μm, and more preferably from 0.1 to 0.3 μm. If the total thickness of the ferromagnetic multilayered film lies outside this range, it is not possible to obtain a sufficiently high recording density.

The magnetic head employing the ferromagnetic multilayered film of the present invention can be adapted to bulky type heads, and can particularly preferably be adapted to thin film magnetic heads.

As for matters that are not mentioned in this specification, knowledge that has been known already in this field of art may be applied to the present invention.

DESCRIPTION OF THE PRESENTLY PREFERRED EMBODIMENT

EXAMPLE 1

Iron of a purity of 99.9% and silicon of a purity of 99.99% were melted and quickly cooled to prepare a sputtering target of the shape of a disc 150 mm in diameter, 5 mm thick, and having a composition Fe—6.5 wt % Si. To the target of Fe—Si alloy were stuck ruthenium plates (ruthenium purity of 99%) of a square shape each side measuring 6 mm and 1 mm in thickness. The number of plates stuck was changed to change the amount of ruthenium of Fe—Si—Ru alloy film formed by the sputtering. As a substrate, use was made of 7059 Glass (trade name of Corning Co., U.S.A.) measuring 10 mm in diameter and 0.5 mm in thickness, and the composition of magnetic film formed by the sputtering was found by the inorganic analysis.

The sputtering was effected by applying a high-frequency voltage under a pressure of $2 \times 10^{-2}$ Torr that was established by introducing an argon gas of a purity of 99.999% into vacuum of $8 \times 10^{-7}$ Torr. The substrate temperature was maintained at 350° C. The sputtering time was about 0.5 hour, and the thickness of the sputtered film was about 1 μm being maintained constant. The pre-sputtering was effected for about one hour to prevent the infiltration of impurities.

Figure 1:
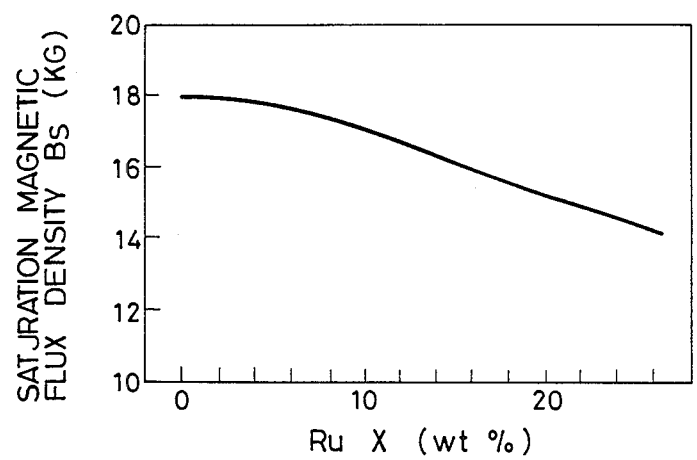
FIG. 1 is a graph showing a relation between the amount of ruthenium in an Fe—Si—Ru alloy and the saturation magnetic flux density.

FIG. 1 shows a relation between the amount of ruthenium X (% by weight) in the Fe—Si—Ru alloy film and the saturation flux density Bs (kG). The amount of ruthenium was found by analyzing the alloy film. As will be obvious from FIG. 1, the saturation flux density Bs of the alloy film is greater than 14 kG even when ruthenium is added in an amount as large as 25% by weight, and is greater than 15 kG even when ruthenium is added in an amount of 20% by weight. It will therefore be understood that the ferromagnetic material composed of Fe—Si—Ru alloy of the present invention exhibits superior magnetic properties to the existing magnetic head materials.

To examine the corrosion resistance, on the other hand, an NaCl aqueous solution of a concentration of 0.5% was sprayed onto the surface of the sputtered film and was left to stand at 35° C. for 100 hours. The condition of the film surface was then observed. For the purpose of comparison, a sputtered film of permalloy (Ni—19 wt % Fe) which is a traditionally used material was used as a standard material. The materials which formed more rust than the standard material were marked with X, and the materials which formed less rust than the standard material were marked with O. It will be comprehended from Table 1 that the corrosion resistance comparable to or superior to that of permalloy is obtained if ruthenium is added in an amount greater than 5% by weight.

TABLE 1

| Ruthenium % by weight | 0 | 3.8 | 5.2 | 7.5 | 11.0 | 17.8 | 24.8 |
|---|---|---|---|---|---|---|---|
| Corrosion resistance | X | X | O | O | O | O | O |

Corrosion resistance was evaluated by measuring anodic polarization curves (Journal of Nippon Kinzoku Gakkai, Vol. 37, No. 10, by Noda et al., 1973, p. 1088) using $H_3BO_3$ buffer solution and a sputtered film as an electrode. It was learned that when ruthenium was added in an amount of greater than 10% by weight, the current density was extremely small in the active state region of the alloy, and metal ions were dissolved little into the aqueous solution, manifesting particularly excellent corrosion resistance. When ruthenium was added in an amount of greater then 15% by weight, the alloy did not exhibit even a peak of current density that would be produced by the anodic passivation film, and corrosion resistance was improved strikingly.

In addition to the case of adding ruthenium, the corrosion resistance was also improved when elements of the platinum group were added or elements of the group Ib were added. However, particularly excellent effects were exhibited when ruthenium was added. When elements other than ruthenium are to be added, the amount of addition should be greater than 5% by weight so that improved corrosion resistance is exhibited but should be smaller than about 25% by weight so that the saturation flux density does not decrease greatly. When ruthenium or the like was added in an amount of smaller than 20% by weight, the saturation flux density decreased little. Since the above-mentioned elements are all expensive, addition in a reduced amount is desirable. Here, however, merits over the conventional materials are not obtained unless the saturation flux density is at least greater than 10 kG. In practice, therefore, the amount of addition should be determined by taking these factors into consideration.

The amount of silicon should lie in a range where high permeability is obtained. According to experiments, the permeability of greater than about 300 was obtained over a range of 2 to 12% by weight, and the alloy could be used as a magnetic pole of a thin film magnetic head. To suppress noise or to prevent the head from being deteriorated in the step of machining, however, the amount of silicon had to be selected over a range of 4.5 to 8% by weight though the optimum amount may vary depending upon the elements to be added. According to this example, silicon was added in an amount of 6.5% by weight.

Addition of aluminum is effective to improve the permeability of the above-mentioned iron-silicon system alloy having high corrosion resistance. The amount of aluminum addition of smaller than about 3% by weight is practical since it does not cause the saturation flux density to decrease greatly.

The addition of at least one element among titanium, chromium, vanadium, molybdenum, zirconium and niobium is desirable since it helps improve the corrosion resistance and wear resistance. To prevent the saturation flux density from decreasing, however, the total amount of these elements added should not be greater than 5% by weight.

EXAMPLE 2

In order to further improve the permeability of the alloy having the composition mentioned earlier, it is effective to laminate the layers of main ferromagnetic film which is composed of the alloy of the invention and which has a thickness of 0.02 to 0.5 μm via spacer material layer which is composed of $SiO_2$, $Al_2O_3$, cobalt, Ni—Fe or the like and which has a thickness of 20 to 500 angstroms. The spacer material layer works to interrupt the growth of columnar crystalline structure of the main ferromagnetic film and to improve magnetic properties. For this purpose, the spacer material layer should adhere well to the main ferromagnetic film and should not melt at an operation temperature. A multilayered film which has a total film thickness of about 2

μm and which is obtained by alternatingly laminating a film of Fe—6.5 wt % Si—10 wt % Ru alloy having a thickness of 0.1 μm and a film of SiO$_2$ having a thickness of 50 angstroms, exhibited a permeability of about 2000 (at 5 MHz, the same frequency is employed hereinafter) that was comparable with that of the permalloy. The multilayered film exhibited a saturation flux density of about 16 kG that was very higher than 10 kG of the permalloy, and also exhibited excellent corrosion resistance, presenting practical advantages. A single layer of Fe—6.5 wt % Si—10 wt % Ru alloy exhibited a permeability of 300 to 500.

The laminate of ferromagnetic films has been disclosed, for example, in the specification of Japanese Patent Application No. 4270/1983 (which is a prior application to the present invention but does not serve as prior art to the present invention).

EXAMPLE 3

A multilayered film having a total film thickness of about 2.1 μm was obtained in the same manner as in Example 2 but using Fe—6.5 wt % Si—20 wt % Ru alloy having a thickness of 0.2 μm as a main ferromagnetic film and a permalloy film having a thickness of 100 angstroms as a spacer material layer. This multilayered film exhibited a saturation flux density Bs of about 15 kG, a permeability of about 1000 at 5 MHz, and very good corrosion resistance.

EXAMPLE 4

The alloy of the present invention can be used as a core material of the bulky-type head, without being laminated. However, in view of the facts that expensive raw materials are used and that soft magnetic properties can be remarkably improved by the lamination, the alloy of the invention should desirably be used as a head core material of the thin film magnetic heads that can be easily laminated and that use ferromagnetic material in reduced amounts.

Figure 2:
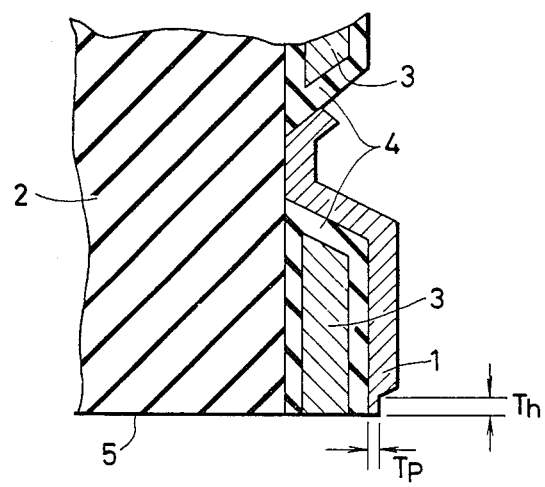
FIG. 2 is a section view showing a major portion of a thin film magnetic head according to an embodiment of the present invention.

FIG. 2 is a section view illustrating a major portion of the head for perpendicular magnetic recording according to the embodiment of the invention, wherein reference numeral 1 denotes a main magnetic pole which generates or detects the magnetic field to effect the recording or reproduction directly, and of which the thickness decreases toward the end thereof. The main magnetic pole is 1 to 2 μm thick in the rear portion. The thickness at the end is reduced by the widely known photoetching method. Reference numeral 2 denotes an auxiliary pole which enables the magnetic flux to flow efficiently, and reference numeral 3 denotes a coil which excites the main pole and detects the change in magnetic flux in the main pole. In Examples 4, 5 and 6, the number of turns of the coil 3 is 16. Reference numeral 4 denotes an insulator. In the head of this embodiment, an Mn—Zn ferrite substrate was used as the auxiliary pole, an SiO$_2$ was used as the insulator, and aluminum was used to form the coil. The main poles were obtained in three types using (a) a single layered film of Ni—19 wt % Fe alloy (which is called permalloy and produces a saturation flux density Bs of about 10 kG), (b) a single layered film of Fe—6.5 wt % Si—10 wt % Ru alloy (saturation flux density Bs of about 17 kG), and (c) a multilayered film (saturation flux density Bs of about 16 kG) obtained by alternatingly laminating a film of Fe—6.5 wt % Si—10 wt % Ru alloy having a thickness of about 0.03 to 0.05 μm and a film of Ni—19 wt % Fe alloy having a thickness of about 0.005 μm.

In a practical head, an insulating film, a coil and a thin film to serve as a main pole were formed by the vacuum deposition or sputtering method onto an Mn—Zn ferrite substrate that served as an auxiliary pole, and then patterns of these films were formed by photolithography.

In the main pole (c), the multilayered film was formed by alternatingly sputtering two kinds of alloys. Thin film patterns formed on the substrate were cut out together with the substrate, and a surface to oppose to the recording medium was formed through the machining such as grinding, lapping and the like, to obtain a head that is diagramed in FIG. 2.

Characteristics of the magnetic heads of the embodiment were evaluated using a perpendicularly magnetizing recording medium obtained by forming a perpendicularly magnetizing film of Co—20 wt % Cr alloy on the layer of a Co—15 at % Mo—10 at % Zr amorphous alloy having a high permeability. Recording density of the magnetic head changes depending upon the recording medium which is to be used in combination therewith. In this embodiment, therefore, characteristics of the magnetic heads were evaluated using the same recording medium.

Figure 4:
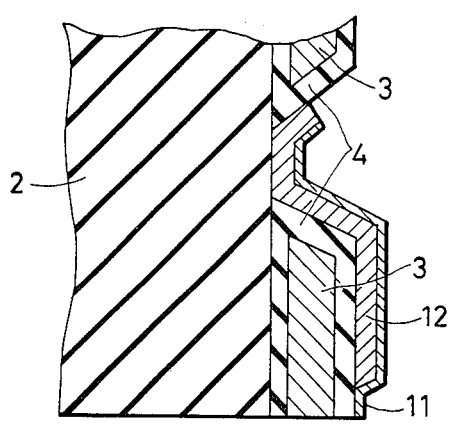
FIG. 4 is a section view showing a major portion of a thin film magnetic head according to another embodiment of the present invention.

FIGS. 2 and 4 do not illustrate coil and the like in the rear portion of the magnetic head (i.e., portion remote from the surface 5 opposing the magnetic recording medium), since they have been substantially illustrated in a conventional thin film head (e.g., Japanese Patent Laid-Open No. 84019/1980).

Figure 3:
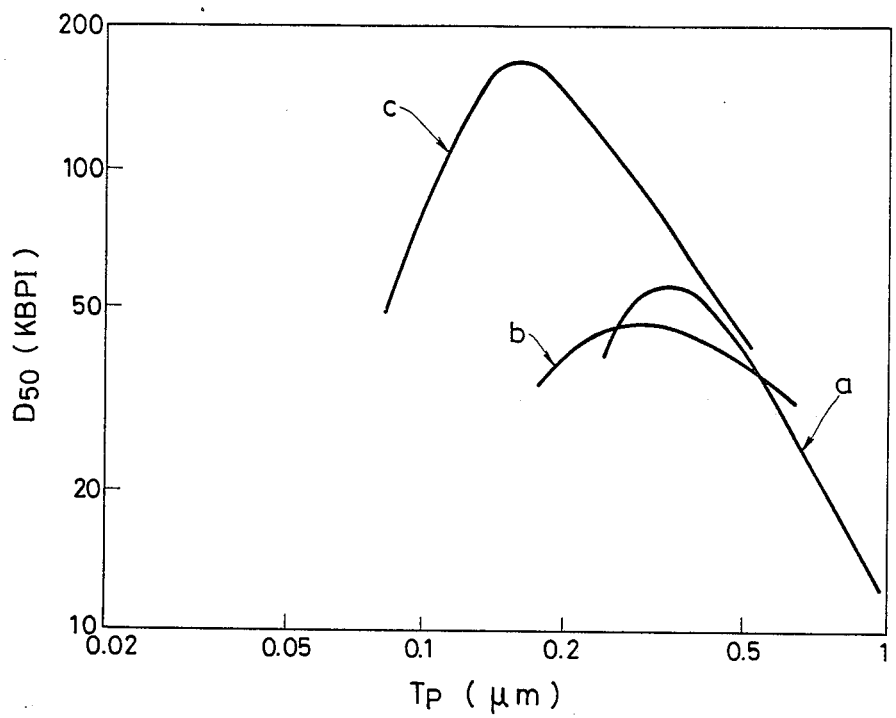
FIG. 3 is a graph showing a relation between the thickness at the end of the main pole and $D_{50}$ (recording density at which the recording/reproducing output of the head becomes one-half the output at a sufficiently low recording density), by using the thin film magnetic head according to the embodiment of the present invention and using other thin film magnetic heads.

FIG. 3 is a graph showing recording density characteristics of the magnetic heads, wherein the abscissa represents the thickness $T_p$ (μm) at the end of the main magnetic pole, and the ordinate represents the recording density $D_{50}$ (KBPI) at which the recording/reproducing output of the head becomes one-half the output at a sufficiently low recording density. Referring to three heads (a), (b) and (c) having different magnetic poles, the conventional heads (a) and (b) having magnetic poles of single layered structure exhibit maximum $D_{50}$ values of 50 KBPI which can be achieved even with the longitudinal magnetic recording system, and present no distinguished merit. On the other hand, the head (c) having magnetic pole of the multilayered structure of the present invention exhibits a $D_{50}$ value of greater than 50 KBPI when the thickness $T_p$ (total thickness of the multilayered film) at the end of the main pole lies within a range of 0.1 μm to 0.5 μm. It will thus be obvious that the magnetic head of the present invention employing multilayered ferromagnetic film exhibits excellent characteristics. The recording density $D_{50}$ is small when the thickness $T_p$ is large. This is because the magnetic pole having a large thickness is not capable of generating the magnetic field sufficiently sharply, and the resolving power remains low. Further, the recording density $D_{50}$ is small even when the thickness $T_p$ is small. This is because the magnetic pole having a small thickness permits magnetic saturation to take place. Therefore, the leakage of magnetic flux increases not only from the end of the magnetic pole but through a portion other than the end, making it difficult to sharply establish the magnetic field. A larger recording density $D_{50}$ is obtained when the thickness $T_p$ is from 0.1 to 0.3 μm.

In the Fe—Si system alloy, greatly improved effects are obtained by lamination when the amount of silicon is about 4.5 to about 8% by weight with respect to Fe+Si. This is presumably related to the fact that the magnetostriction constant is zero in the Fe—6.5 wt % Si alloy.

The height Th (length in a direction perpendicular to the surface which is opposed to the magnetic recording medium) of the portion of thickness $T_p$, was selected to be about 2 μm.

The height Th is usually selected over a range of 0.5 μm to 10 μm. If the height Th becomes greater than 10 μm, magnetic saturation takes place easily, and high recording density is not obtained. If the height Th is smaller than 0.5 μm, sufficiently long life of the head is not obtained.

EXAMPLE 5

The heads mentioned in the foregoing examples were constructed most simply. The construction, however, is further contrived in order to enhance the head performance. For instance, referring to FIG. 4 which is a section view showing a major portion, a thin portion 11 of the main pole at the end of the head that plays an important role in the recording and reproducing operation is formed in a multilayered construction according to the present invention, and a rear thick portion 12 is made of a material having a high permeability such as permalloy or an amorphous alloy in order to decrease the reluctance thereof.

EXAMPLE 6

Figure 5:
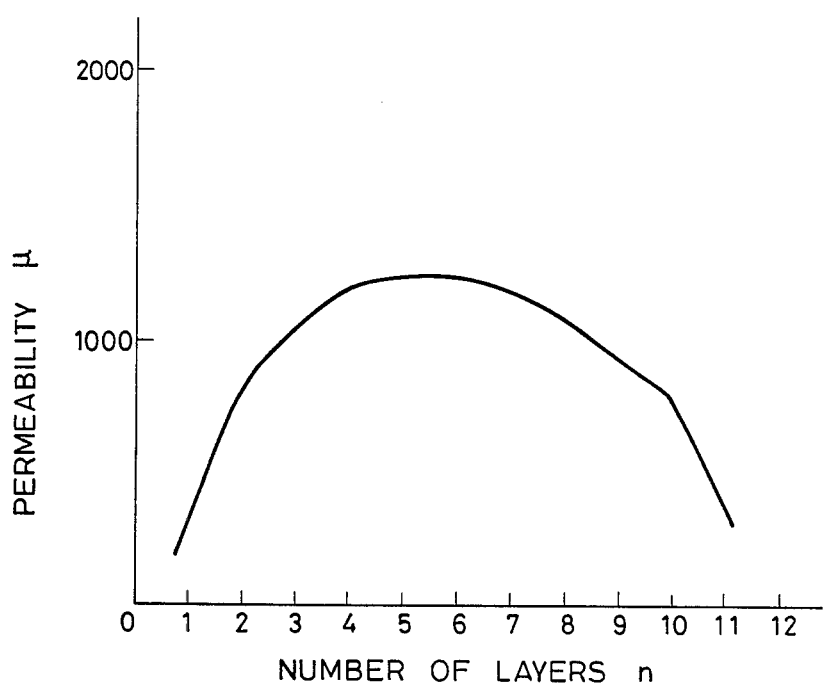
FIG. 5 is a graph showing a relation between the number of layers and the permeability of a ferromagnetic multilayered film according to other embodiments of the present invention.

Using an Fe—6.5 wt % Si—6 wt % Ru alloy as a magnetic film, i.e., as a main ferromagnetic film having a high saturation flux density, and using an Ni—17 wt % Fe alloy as a spacer material layer, a laminate was obtained having a total film thickness of 0.5 μm while maintaining the thickness ratio of these films at 9 to 1. FIG. 5 shows the change of permeability μ with the change in the number n of layers. Here, the Fe—6.5 wt % Si—6 wt % Ru alloy and the Ni—17 wt % Fe alloy were continuously formed in vacuum by the RF sputtering method. Representative preparation conditions consisted of a substrate temperature of 350° C., background pressure of $8 \times 10^{-7}$ Torr, and argon pressure of $2 \times 10^{-2}$ Torr during the sputtering. The RF electric power was 500 watts in the case of forming the Fe—6.5 wt % Si—6 wt % Ru alloy and 175 watts in the case of forming the Ni—17 wt % Fe alloy. Thickness of each of the layers was controlled by changing the sputtering time. The saturation flux density of the multilayered film was about 17 kG and remained almost constant irrespective of the number n of layers. The Ni—17 wt % Fe alloy of the uppermost layer (n-th layer) may be eliminated since its presence effects the characteristics very little.

The film consisting of the Fe—6.5 wt % Si—6 wt % Ru alloy (having a thickness of about 0.45 μm) and the Ni—17 wt % Fe alloy (having a thickness of about 0.05 μm) with the layer number n=1, exhibits a permeability of as low as about 300 which is not a satisfactory property if it is to be used for the magnetic pole of the head. Therefore, it is desired to improve this property. Usually, a low permeability is exhibited by a magnetic film having a thickness of smaller than about 0.5 μm, such as widely known soft magnetic alloy film composed of Ni—Fe system crystalline alloy, Co—Zr system amorphous alloy or the like. In the heads for perpendicular recording as shown in FIGS. 2 and 4, it is necessary to reduce the thickness at the end of the main pole such that the magnetic field is generated sharply and detected by the main poles 1, 11 for recording/reproducing operation. For instance, to effect the recording and reproducing at a recording density of greater than 50 KBPI, it had been known that the thickness must be smaller than about 0.5 μm (smaller than 0.3 μm to obtain the recording density of greater than 100 KBPI). This, however, could not be accomplished since a thin film having good magnetic properties was not obtained.

Figure 6:
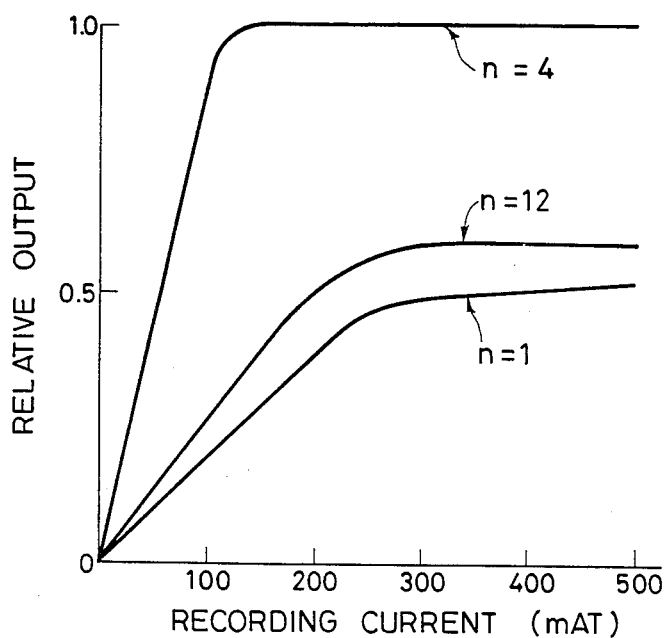
FIG. 6 is a graph showing a relation between the recording current and the output of the thin film magnetic heads according to other embodiments of the present invention.

FIG. 5 is a graph showing a relation between the number n of layers and the permeability μ (at 5 MHz). It will be seen from FIG. 5 that the permeability is high when the number n of layers is from 2 to 10, and is particularly high when the number n of layers is from 4 to 8, rendering the multilayered film well for use as a material for a head. Thin film heads were practically prepared as representatively shown in cross section in FIG. 4. When the number of layers was changed in a manner of n=1, 4, 12 in the main pole opposed to the recording medium, the recording current characteristics were as shown in FIG. 6, from which excellent performance of the present invention will be comprehended. In the heads with a main pole having other number of layers, the recording current characteristics also changed depending upon the permeability shown in FIG. 5. Namely, relatively good recording current characteristics were exhibited when the number of layers was n=2 to 10, good recording current characteristics were exhibited when n=4 to 8, and particularly good characteristics were exhibited when n=4 to 6. The thin film head can be prepared by the same technique for producing semiconductor elements, namely by the photolithographic technique, by the sputtering method, or by the deposition method. However, these methods have been widely known and are not mentioned here closely.

The magnetic head employing the ferromagnetic multilayered film of the present invention can be adapted not only to the thin film head but also to the head of the bulky type, as a matter of course.

The magnetic head employing the ferromagnetic multilayered film of the present invention is particularly advantageous for achieving a high recording density of greater than 100 KBPI that could be achieved so far only by the perpendicular recording system having a total film thickness of smaller than 0.3 μm. In this case, an optimum number n of the layers was from 4 to 6.

Magnetic alloys such as Ni—Fe system alloys represented by Ni—17 wt % Fe alloy and cobalt system alloys represented by cobalt, were particularly effective for use as spacer material layers, and insulating materials such as $SiO_2$ and $Al_2O_3$ were also effective. However, a low-melting material such as aluminum deteriorated the characteristics seriously when laminated, since it reacted with the ferromagnetic film of a high saturation flux density.

EXAMPLE 7

Examples 4, 5 and 6 have dealt with a so-called thin-film head prepared by the technique for forming thin films, that is widely known in the art of semiconductor devices. The bulky-type head can also be obtained using the ferromagnetic multilayered film of the present invention through machine work.

Figure 7:
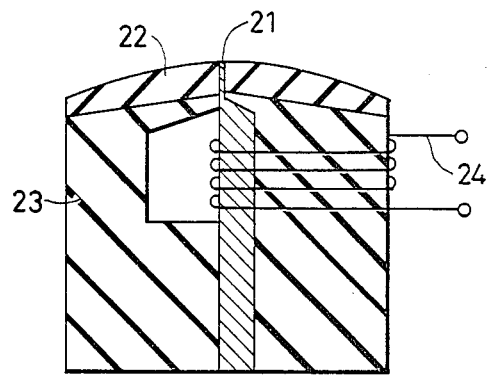
FIGS. 7 and 8 are section views of magnetic heads for perpendicular magnetic recording according to further embodiments of the present invention.

FIG. 7 is a diagram illustrating an example, wherein reference numeral 21 denotes a main pole of the multilayered structure, 22 denotes a non-magnetic member (such as non-magnetic ferrite) which mechanically protects the main pole, 23 denotes a magnetic material such as Mn—Zn ferrite or the like that serves as an auxiliary pole, and 24 denotes a coil. The present invention can further be adapted to the magnetic pole (main pole) of a variety of recording/reproducing heads that have hitherto been proposed as heads for perpendicular magnetic recording.

EXAMPLE 8

Figure 8:
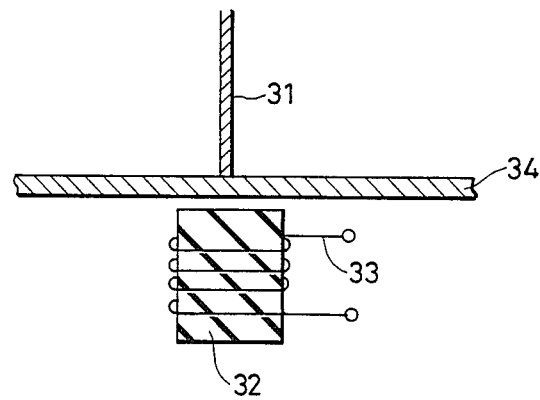

FIG. 8 is a section view which schematically shows a widely known single-pole type (SPT) head in which the auxiliary pole is energized. In this case, the recording density characteristics can be greatly improved by employing a main pole of the multilayered structure of the present invention as designated at 31.

In FIG. 8, reference numeral 32 denotes an auxiliary pole, 33 denotes a coil, and 34 denotes a recording medium.

EXAMPLE 9

Figure 9:
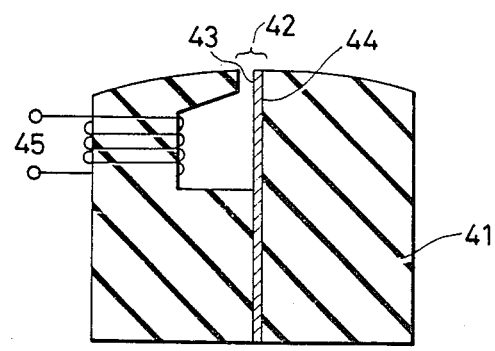
FIG. 9 is a section view of a ring type magnetic head according to yet a further embodiment of the present invention.

Distinguished effects are obtained when the present invention is adapted to the head for perpendicular magnetic recording. The invention, however, can also be adapted to a ring head for longitudinal magnetic recording. In the ring-type head, the magnetic field is generated from the magnetic gap and is detected. It can therefore be easily imagined that the magnetic field is sharply distributed if the magnetic material in the vicinity of the gap is formed in a multilayered structure to have a high saturation flux density. The magnetic field can be sharply generated if use is made of a material 44 of a high saturation flux density having multilayered structure on one side 43 (or both sides) of a surface constituting a magnetic gap 42 in the ring-like magnetic pole 41 as shown in FIG. 9. Compared with the conventional ring heads, therefore, improved characteristics will be obtained even when the signals are recorded onto a perpendicularly magnetizing medium or are reproduced therefrom. In FIG. 9, reference numeral 41 denotes a magnetic material such as Mn—Zn ferrite which constitutes an ordinary ring head, and 45 denotes a coil.

The ferromagnetic material of the present invention has both a high saturation flux density and an excellent corrosion resistance, and is suited, for example, for use as a core material of magnetic heads. Particularly, the ferromagnetic multilayered film of the present invention is suited for use as a core material of thin-film magnetic heads.

Further, according to the magnetic head of the present invention, at least a portion or whole of at least one magnetic pole is constituted by the ferromagnetic material or the ferromagnetic multilayered film of the present invention. In particular, in the magnetic head of the present invention, a portion of the magnetic pole on the side of the recording medium, which generates and detects the signal magnetic field, is constituted by the ferromagnetic material or the ferromagnetic multilayered film of the present invention. Therefore, the magnetic head of the present invention is capable of sharply generating and detecting the magnetic field, and helps increase the recording density by two folds or more compared with the conventional recording density when the perpendicular magnetic recording and reproduction are effected.

Obviously many modifications and variations of the present invention are possible in the light of the above teachings. It is therefore to be understood that within the scope of the appended claims the invention may be practiced otherwise than as specifically described.

What is claimed is:

1. A ferromagnetic material comprising a crystalline iron alloy which consists essentially of 2 to 12% by weight of silicon, 10 to 20% by weight in total of at least one element selected from the group consisting of ruthenium, rhodium, palladium, iridium, platinum, gold, and silver, and the balance iron.

2. A ferromagnetic material according to claim 1, wherein said iron alloy has 15 to 20% by weight of at least one element selected from the group consisting of ruthenium, rhodium, palladium, iridium, platinum, gold and silver.

3. A ferromagnetic material according to claim 1, wherein the iron alloy has a content of silicon ranging from 4.5 to 8% by weight.

4. A ferromagnetic material according to claim 2, wherein the iron alloy has a content of silicon ranging from 4.5 to 8% by weight.

5. A ferromagnetic layered material obtained by alternatingly laminating a main ferromagnetic film and a spacer material layer, said main ferromagnetic film being a crystalline iron alloy which consists essentially of 2 to 12% by weight of silicon, 10 to 20% by weight in total of at least one element selected from the group consisting of ruthenium, rhodium, palladium, iridium, platinum, gold and silver, and the balance iron and said spacer material layer being a material which adheres well to said main ferromagnetic film and which does not melt at operation temperatures of said ferromagnetic material.

6. A ferromagnetic layered material according to claim 5, wherein said iron alloy has 15 to 20% by weight of at least one element selected from the group consisting of ruthenium, rhodium, palladium, iridium, platinum, gold and silver.

7. A ferromagnetic layered material according to claim 5, wherein the iron alloy has a content of silicon ranging from 4.5 to 8% by weight.

8. A ferromagnetic layered material according to claim 6, wherein the iron alloy has a content of silicon ranging from 4.5 to 8% by weight.

9. A magnetic head wherein at least a portion of at least one magnetic pole is comprised of a crystalline iron alloy which consists essentially of 2 to 12% by weight of silicon, and 10 to 20% by weight in total of at least one element selected from the group consisting of ruthenium, rhodium, palladium, iridium, platinum, gold and silver and the balance iron.

10. A magnetic head according to claim 9, wherein said iron alloy has 15 to 20% by weight of at least one element selected from the group consisting of ruthenium, rhodium, palladium, iridium, platinum, gold and silver.

11. A magnetic head according to claim 9, wherein the iron alloy has a content of silicon ranging from 4.5 to 8% by weight.

12. A magnetic head according to claim 10, wherein the iron alloy has a content of silicon ranging from 4.5 to 8% by weight.

13. A magnetic head wherein at least a portion of at least one magnetic pole is composed of a ferromagnetic multilayered film constituted by alternatingly laminating a main ferromagnetic film and a spacer material layer, said main ferromagnetic film being composed of a crystalline iron alloy which consists essentially of 2 to 12% by weight of silicon, 10 to 20% by weight in total of at least one element selected from the group consisting of ruthenium, rhodium, palladium, iridium, platinum, gold and silver, and the balance iron, and said spacer material layer being composed of a material which adheres well to said main ferromagnetic film and which does not melt at operation temperatures of said ferrmagnetic material.

14. A magnetic head according to claim 13, wherein said iron alloy has 15 to 20% by weight of at least one element selected from the group consisting of ruthenium, rhodium, palladium, iridium, platinum, gold and silver.

15. A magnetic head according to claim 13, wherein the iron alloy has a content of silicon ranging from 4.5 to 8% by weight.

16. A magnetic head according to claim 14, wherein the iron alloy has a content of silicon ranging from 4.5 to 8% by weight.

17. A magnetic head according to claim 13, wherein said iron alloy consists of silicon, ruthenium, and the balance iron.

18. A ferromagnetic material comprising a crystalline iron alloy which consists essentially of 2 to 12% by weight of silicon, 10 to 20% by weight in total of at least one element selected from the group consisting of ruthenium, rhodium, palladium, iridium, platinum, gold and silver, less than 3% by weight of aluminum, up to less than 5% by weight of at least one element selected from the group consisting of chromium, vanadium, molybdenum, zirconium and niobium, and the balance iron.

19. A ferromagnetic layered material obtained by alternately laminating a main ferromagnetic film and a spacer material layer, said main ferromagnetic film being a crystalline iron alloy which consists essentially of 2 to 12% by weight of silicon, 10 to 20% by weight in total of at least one element selected from the group consisting of ruthenium, rhodium, palladium, iridium, platinum, gold and silver, less than 3% by weight of aluminum, up to less than 5% by weight of at least one element selected from the group consisting of chromium, vanadium, molybdenum, zirconium and niobium, and the balance iron, and said spacer material being a material which adheres well to said main ferromagnetic film and which does not melt at operation temperatures of said ferromagnetic material.

20. A magnetic head wherein at least a portion of at least one magnetic pole is comprised of a crystalline iron alloy which consists essentially of 2 to 12% by weight of silicon, 10 to 20% by weight in total of at least one element selected from the group consisting of ruthenium, rhodium, palladium, iridium, platinum, gold and silver, less than 3% by weight of aluminum, up to less than 5% by weight of at least one element selected from the group consisting of chromium, vanadium, molybdenum, zirconium and niobium, and the balance iron.

21. A magnetic head wherein at least a portion of at least one magnetic pole is composed of a ferromagnetic multilayered film constituted by alternately laminating a main ferromagnetic film and a spacer material layer, said main ferromagnetic film being a crystalline iron alloy which consists essentially of 2 to 12% by weight of silicon, 10 to 20% by weight in total of at least one element selected from the group consisting of ruthenium, rhodium, palladium, iridium, platinum, gold and silver, less than 3% by weight of aluminum, up to less than 5% by weight of at least one element selected from the group consisting of chromium, vanadium, molybdenum, zirconium and niobium, and the balance iron, and said spacer element being composed of a material which adheres well to said main ferromagnetic film and which does not melt at operation temperatures of said ferromagnetic films.

22. A ferromagnetic material according to claim 1, wherein said iron alloy exhibits an iron saturation flux density of greater than 15 KG.

23. A ferromagnetic layered material according to claim 5, wherein said iron alloy exhibits an iron saturation flux density of greater than 15 KG.

24. A magnetic head according to claim 9, wherein said iron alloy exhibits an iron saturation flux density of greater than 15 KG.

25. A magnetic head according to claim 13, wherein said iron alloy exhibits an iron saturation flux density of greater than 15 KG.

* * * * *